United States Patent [19]

Masuzawa et al.

[11] 4,336,594
[45] Jun. 22, 1982

[54] AUTOMATIC STEERING APPARATUS FOR SHIPS

[75] Inventors: Isao Masuzawa; Kanshi Yamamoto, both of Kuroiso; Yoichi Hirokawa, Kamakura, all of Japan

[73] Assignee: Tokyo Keiki Co., Ltd., Tokyo, Japan

[21] Appl. No.: 154,397

[22] PCT Filed: Dec. 27, 1978

[86] PCT No.: PCT/JP78/00070
§ 371 Date: Aug. 28, 1979
§ 102(e) Date: Aug. 24, 1979

[87] PCT Pub. No.: WO79/00447
PCT Pub. Date: Jul. 26, 1979

[30] Foreign Application Priority Data

Dec. 28, 1977 [JP] Japan .................. 52-160612

[51] Int. Cl.$^3$ .................. B63H 25/04; G06G 7/78
[52] U.S. Cl. .................. 364/457; 364/447; 318/588; 318/610
[58] Field of Search .................. 364/443, 444, 452, 447, 364/457; 318/588, 609, 610, 620, 590, 591, 647; 114/144 E; 73/178 R

[56] References Cited

U.S. PATENT DOCUMENTS

| | | | |
|---|---|---|---|
| 3,604,907 | 9/1971 | Wesner | 114/144 R |
| 3,696,282 | 10/1972 | Hirokawa et al. | 318/588 |
| 3,698,829 | 10/1972 | Kubo et al. | 318/610 |
| 3,741,474 | 6/1973 | Kawada et al. | 364/457 |
| 3,852,650 | 12/1974 | Masuzawa et al. | 318/588 |
| 3,927,635 | 12/1975 | Masuzawa et al. | 364/457 |
| 3,946,690 | 3/1976 | Van Holtz et al. | 364/447 |
| 4,049,971 | 9/1977 | Le Febve De Vivy | 318/610 |

FOREIGN PATENT DOCUMENTS

| | | |
|---|---|---|
| 40-22727 | 8/1965 | Japan . |
| 43-17540 | 7/1968 | Japan . |
| 43-17541 | 7/1968 | Japan . |
| 48-83592 | 11/1973 | Japan . |
| 51-64297 | 6/1976 | Japan . |
| 1451253 | 9/1976 | United Kingdom .................. 318/588 |

*Primary Examiner*—Errol A. Krass
*Assistant Examiner*—Gary Chin
*Attorney, Agent, or Firm*—Fleit & Jacobson

[57] ABSTRACT

The present invention relates to an automatic steering apparatus for ships which prevents the occurrence of directional instability due to unusual phenomena which occur at small rudder angles of so-called full-bodied ships.

When the rudder angle of such ship is small, two stable steady turning conditions occur so that the turning movement cannot assume any single state and it results in a frequent and irregular unstable ship motion. Thus, in accordance with the invention there is provided an automatic steering apparatus of the type in which a command rudder angle signal is produced from a deviation signal representing the difference between a predetermined course and the ship's heading by means of a operational circuit and a rudder angle servomechanism, wherein a compensating circuit is provided before the operational circuit and the gain of the compensating circuit is increased when the deviation signal is in the small range, thus preventing any unstable ship motion of the ship and thereby preventing the occurrence of directional instability.

8 Claims, 12 Drawing Figures

AUTOMATIC STEERING APPARATUS FOR SHIPS

TECHNICAL FIELD

The invention relates to automatic steering apparatus for ships and more particularly the invention relates to an automatic steering apparatus for ships capable of preventing any directional instability of a ship due to an unusual phenomenon.

BACKGROUND ART

The ships built recently have been enlarged excessively in form for both large and small ships and their directional or course stability have tended to deteriorate.

The degree of directional stability of a ship has usually been determined by steering the ship according to the inverse spiral (or spiral) test or the like and utilizing data obtained from the relation between the rudder angles and the turning angular speeds of the ship.

Experience with the ships which were full-bodied beyond a certain extent has proved the occurrence of cases where the movement caused by steering will not be determined linearly and these cases are called as "unusual phenomena" in the learned circles, etc. These abnormally unstable ships (the ships which exhibit such unusual phenomena) have two or more stable steady turning conditions so that the movement of the ship caused by steering does not result in any single movement and a phenomenon of unstable ship motion occurs. According to the recent publications made in the learned circles, etc., this phenomenon is attributable to the fact that the ship has two or more stable turning resistances with respect to the same turning condition and it has also been said that the phenomenon is due to particular fluid forces which will be caused in the vicinity of the stern. An unusual phenomenon occurs when the relation between the movement of the ship's hull and the surrounding water current attains a certain condition so that the ship shifts to other stable points, and consequently the unusual phenomenon occurs intermittently at any time thus differing in phenomenon from the ordinary directional instability.

Considering the control of such ships having high degrees of directional instability from the standpoint of course keeping control, it is universally admitted that in the case of the ordinary directional instability, even if there exists a hysteresis loop for the steering characteristic of the ship, it is possible to stably control the course by inserting a sufficient phase compensating element in the control loop of the automatic steering system. However, in the case of ships which are subject to directional instability due to the unusual phenomena, it is impossible to stably control the course with a measure employing such a linear compensating element.

It has been announced that directional instability due to unusual phenomena is caused particularly by separation from the bottom surface or rounding of the water current accelerated by the propeller which is flowing to the vicinity of the stern of the full-bodied ship. In particular, considerable research works have been published with respect to the mechanism of forces which are produced laterally to the ships hull and effect on course keeping control.

It can be pointed out in common to these works that in the range where the steering rudder angles of ships are relatively small and hence the turning movements of the ship are small, the water current at the stern shows two steady patterns in some cases. This means that ship has two stable steady turning conditions for each rudder angle, and in the case of the ordinary automatic steering (also in the case of the manual steering) where the ship is moved straight ahead with a so-called small rudder angle making practically no turning movement, the movement of the ship does not take any definite pattern but results in a frequent unstable ship motion.

DISCLOSURE OF THE INVENTION

It is the principal object of the present invention to provide a steering apparatus for ships which is capable of overcoming directional instability due to the previously mentioned unusual phenomena and controlling the course of a ship accurately.

The present invention features that in an automatic steering apparatus for ships comprising a operational circuit and a rudder angle servomechanism whereby a rudder order signal is produced from the difference between ship's heading and a preset course, a compensating circuit is provided before the operational circuit and the gain of the compensating circuit is increased when the deviation signal is in the small range. In other words, in the small course deviation ranges a large control signal is generated to quickly effect the steering and the steering characteristics of the ship are improved so as to cause the water current at the stern to settle a single turning pattern corresponding to each rudder angle, thus ensuring stable steering, this arrangement being applicable to all types of ships.

In the Figures, numeral (1) designates an adding mechanism, (2) a compensating circuit, (3) a operational circuit, (4) a rudder angle servomechanism, (A) an operational amplifier, ($R_i$), ($R_D$) and ($R_f$) resistors, ($R'_D$) a variable resistor, and (D) a nonlinear unit.

BEST FORMS FOR EMBODYING THE INVENTION

Figure 1:
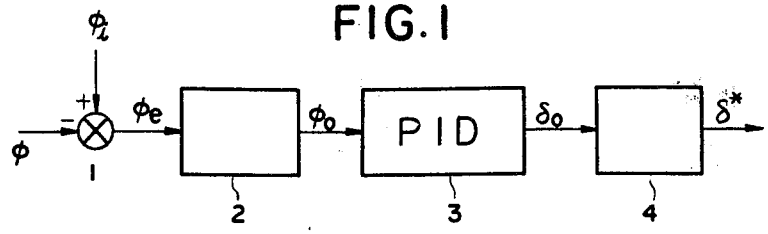
FIG. 1 is a block diagram showing an embodiment of the present invention.
Figure 2:
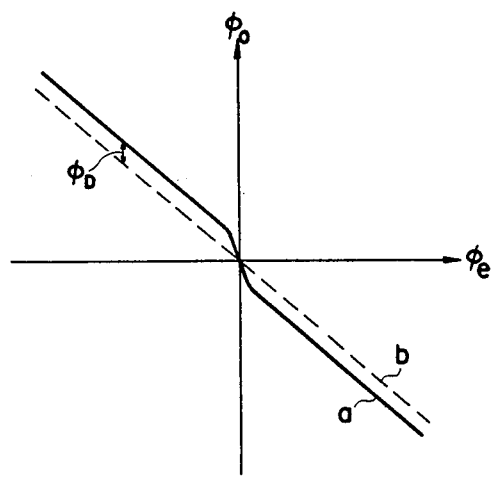
FIG. 2 is a characteristic diagram of the compensating circuit in the embodiment of FIG. 1.

Now, an example of the automatic steering apparatus for ships according to the invention will be described with reference to FIG. 1. In FIG. 1, numeral (1) designates a summing mechanism whereby a ship's heading signal $\phi$ is compared with a present course signal $\phi_i$ and the resulting difference is converted into an electrical signal which is in turn generated as a course deviation signal $\phi_e$. Numeral (2) designates a compensating circuit adapted to receive the course deviation signal $\phi_e$ and having an input-output characteristic such as shown in FIG. 2. Numeral (3) designates a operational circuit for receiving the output signal $\phi_o$ of the compensating circuit (2) to perform the operations of "proportional plus derivative" (PD) or "proportional plus integral plus derivative" (PID) action. The purpose of the operational circuit (3) is to linearly compensate the automatic steering system including the steering gear and the ship which is the controlled system so as to improve the response of the steering control loop. Numeral (4) designates a rudder angle servomechanism for receiving the computation result or output signal $\delta_o$ of the operational circuit (3) to generate a command rudder angle $\delta^*$ in the form of a mechanical position or angular signal. Although not shown in FIG. 1, the command rudder angle $\delta^*$ or the output of the rudder angle servomechanism (4) is applied to the steering gear of the ship and the actual rudder angle is determined. This rudder angle causes the ship to make a turning movement so that the resulting change in the ship's heading is detected by a gyro compass or magnetic compass and fed back as a ship's heading signal $\phi$ to the summing mechanism (1). In this way, a closed loop for automatic steering is established and the heading of the ship is maintained at the preset course.

Figure 3:
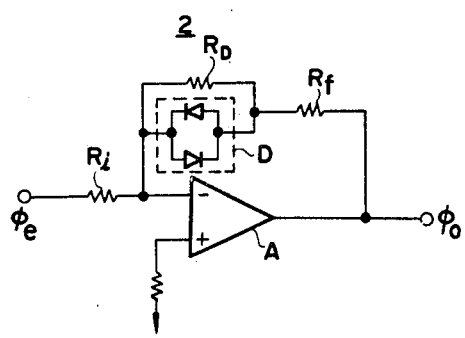
FIG. 3 is a circuit diagram showing an embodiment of the compensating circuit.
Figure 4A:
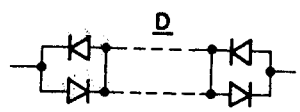
FIGS. 4A and 4B are wiring diagrams showing another embodiments of a part of the compensating circuit.
Figure 4B:
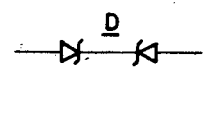
Figure 5:
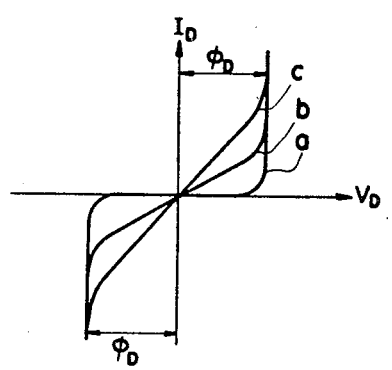
FIG. 5 is a characteristic diagram of the nonlinear circuit in the compensating circuit.

Now, the compensating circuit (2) constituting a characteristic feature of the invention will be described in detail. FIG. 3 shows an embodiment of the compensating circuit (2). In this embodiment, an input signal $\phi_e$ is applied to an input terminal (−) of an operational amplifier (A) through an input resistor ($R_i$), and connected between the amplifier output terminal and the input terminal (−) is a circuit comprising a series connection of a resistor ($R_f$) and a circuit comprising a parallel connection of a nonlinear unit (D) and a resistor ($R_D$) (hereinafter referred to as a non-linear circuit). While, in this embodiment, the nonlinear unit (D) comprises two diodes connected in an inverse parallel relation, the same objective may be attained by means of a plurality of diodes connected in an inverse parallel relation as shown in FIG. 4A or by means of two Zener diodes connected in series and opposite polarity to each other. Generally, the characteristic of such nonlinear unit (D) is such that when a current ($I_D$) which is higher than a certain value flows to the unit (D), its terminal voltage ($V_D$) is saturated. If the saturated voltage is represented as $\phi_D$, the characteristic of the non-linear unit (D) will be represented as shown by the curve (a) in FIG. 5. The characteristics of the non-linear circuit including the resistor ($R_D$) connected in parallel with the nonlinear unit (D) will be represented as shown by the curves (b) and (c) in FIG. 5. The characteristic curve (c) corresponds to one obtained when the resistance value of the resistor ($R_D$) is lower than in the case of the characteristic curve (b).

Such as shown by the curve (a) in FIG. 2 is the input-output characteristic of the compensating circuit (2) shown in FIG. 3 and including in the feedback circuit of the operational amplifier (A) the nonlinear circuit having the previously mentioned characteristic. Shown at (b) in the Figure is a straight line showing the characteristic obtained without the nonlinear circuit, that is, when the feedback circuit comprises only the resistor ($R_f$). The characteristic of the compensating circuit (2) is such that the slope is increased at small values of the course deviation signal $\phi_e$, that is, the input-output gain increases in the small course deviation range and in the output signal $\delta_o$ of the operational circuit (3) receiving the output signal $\phi_o$ of the compensating circuit (2) the output signal due to the proportionality and derivative is increased, thus attaining the previously mentioned objective. In other words, when an unusual phenomenon causes the ship to start unstable motion in its course, the compensating circuit (2) immediately generates an output signal $\phi_o$ due to an increased gain as mentioned previously so that a command rudder angle $\delta^*$ including a large "proportional plus derivative" signal is generated through the operational circuit (3) and the rudder angle servomechanism (4), thus suppressing the hunting of the ship. As a result, even if any unusual phenomenon occurs on the ship, unstable motion of the ship in its course will not be caused.

Figure 6:
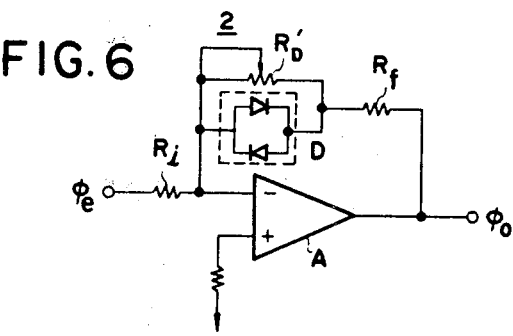
FIG. 6 is a circuit diagram showing another embodiment of the compensating circuit.
Figure 7:
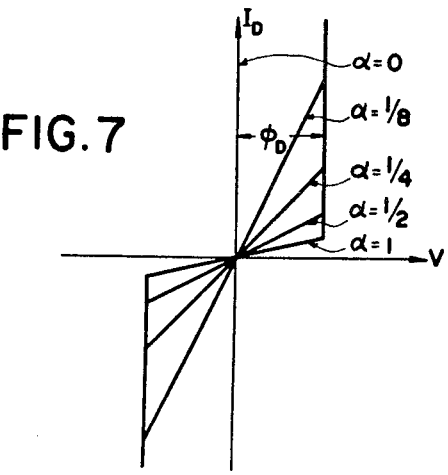
FIG. 7 is a characteristic diagram of the nonlinear circuit of the compensating circuit.

FIG. 6 shows another embodiment of the compensating circuit (2) constituting the characteristic feature of the invention. This embodiment is identical with the embodiment of FIG. 3 except that the resistor ($R_D$) is replaced with a variable resistor ($R'_D$). If the characteristic of the nonlinear circuit in the embodiment of FIG. 6 is approximated by a straight line as shown in FIG. 7, the input-output characteristic of the compensating circuit (2) shown in FIG. 6 can be given by the following equation.

$$\phi_o \begin{cases} -\dfrac{R_f + R_D'}{R_i} \phi_e & \cdots \quad |\phi_e| \leq \dfrac{R_i}{R_D'} \phi_D \\ -\dfrac{R_f}{R_i} \phi_e - \phi_D \dfrac{\phi_e}{|\phi_e|} & \cdots \quad |\phi_e| \geq \dfrac{R_i}{R_D'} \phi_D \end{cases} \quad (1)$$

Here, $R_i$ and $R_f$ respectively represent the resistance values of the resistors ($R_i$) and ($R_f$) and $R'_D$ represents the adjusted resistance value of the variable resistor ($R'_D$).

If K represents the input-output gain of the compensating circuit (2), it can be given by the following equation.

$$K = -\dfrac{\phi_o}{\phi_e} = \begin{cases} \dfrac{R_f + R_D'}{R_i} & \cdots \quad |\phi_e| \leq \dfrac{R_i}{R_D'} \phi_D \\ \dfrac{R_f}{R_i} + \dfrac{\phi_D}{|\phi_e|} & \cdots \quad |\phi_e| \geq \dfrac{R_i}{R_D'} \phi_D \end{cases} \quad (2)$$

Assuming that the nominal resistance value of the variable resistor ($R'_D$) is represented by $R_{Do}$ and its adjusted value is represented by $\alpha R_{Do}$, then the characteristic of the non-linear circuit which is approximated with a straight line, varies according to the value of amount of adjustment $\alpha$ as shown in FIG. 7. In the Figure, $\alpha = 0$ corresponds to short-circuiting of the variable resistor ($R'_D$) and it agrees with the case where the non-linear circuit is absent.

Figure 8:
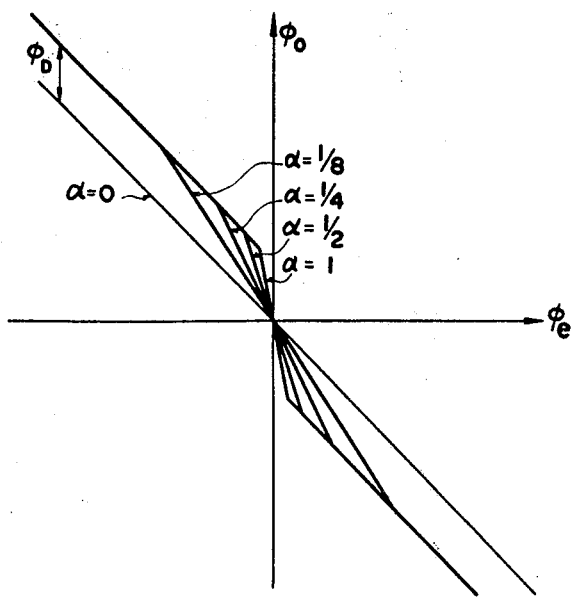
FIGS. 8 and 9 are characteristic diagrams of the compensating circuit shown in FIG. 6, and FIGS. 10 and 11 are block diagrams shown other embodiments of the invention.
Figure 9:
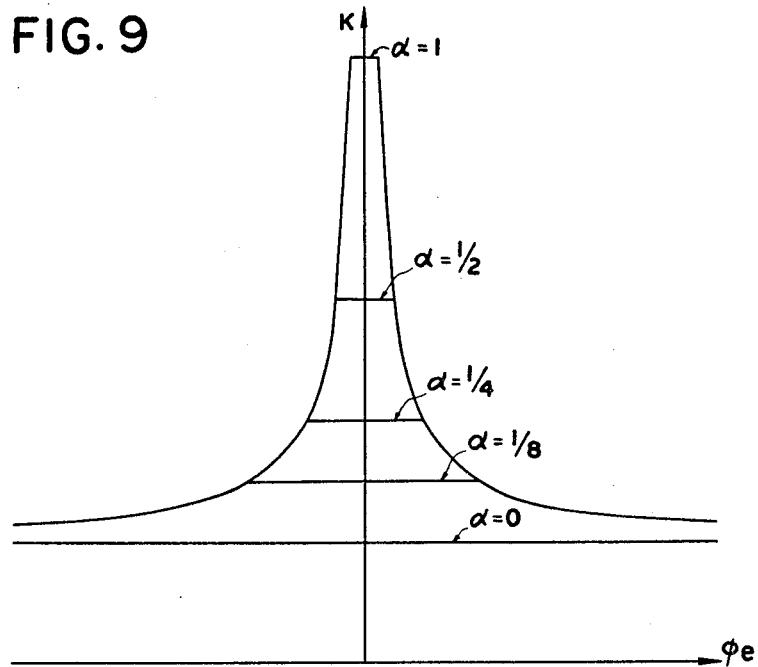

Now, with the resistance values of the resistors ($R_i$) and ($R_f$) and the nominal resistance value of the variable resistor ($R'_D$) being selected suitably by way of example, the input-output characteristic of the compensating circuit (2) which is given by the equation (1) and its input-output gain given by the equation (2) can be represented graphically as shown in FIGS. 8 and 9, respectively.

As will be seen from FIGS. 8 and 9, the characteristic of the compensating circuit (2) shown in FIG. 6 is such that in the small range of course deviation $\phi_e$ the slope of its input and output increases and the input-output gain also increases and moreover their magnitudes can be varied in dependence on the amount of adjustment $\alpha$ of the variable resistor ($R'_D$). As a result, by suitably selecting the amount of adjustment $\alpha$ of the variable resistor ($R'_D$) in accordance with the degree of unusual instability of a ship, it is possible to obtain more satisfactory results.

Thus, the above-mentioned embodiment of the invention shown in FIG. 6 is advantageous in that it can be used with ships which are not subject to directional instability due to unusual phenomena by simply making an adjustment ($\alpha=0$) so as to short-circuit the variable resistor ($R'_D$), and consequently there is no need to prepare a separate automatic steering apparatus for each of the ships which are subject to directional instability due to unusual phenomena, those subject to the ordinary directional instability and the directionally stable ships.

Figure 10:
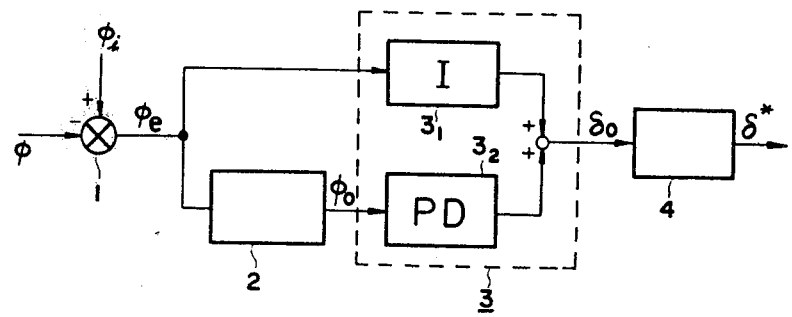

FIG. 10 shows another embodiment of the automatic steering apparatus for ships according to the invention. In the Figure, the component parts which are the same with those of FIG. 1 are designated by the like reference numerals. The embodiment of FIG. 10 is identical with the embodiment of FIG. 1 except that the operational circuit (3) is divided into an integral action (I) circuit ($3_1$) and a "proportional plus derivative action (PD)" circuit ($3_2$) and that the input to the integral action circuit ($3_1$) is the course deviation signal $\phi_e$ and the input to the "proportional plus derivative action" circuit ($3_2$) is the output signal $\phi_o$ of the compensating circuit (2). It will be evident that the embodiment of FIG. 10 attains the same objective. The reason is that as previously mentioned, the stability can be obtained by producing a large proportional signal as well as a large derivative signal in the small course deviation region.

Figure 11:
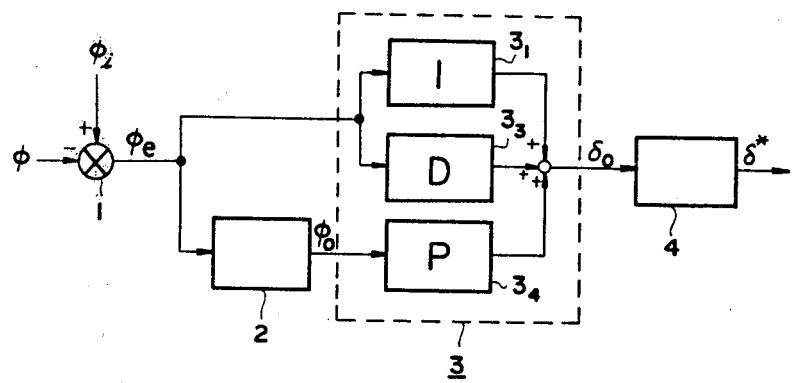

Still another embodiment of the automatic steering apparatus for ships according to the invention is shown in FIG. 11. In the Figure, the component parts which are the same with those of FIG. 10 are designated by the like reference numerals. The embodiment of FIG. 11 is identical with the embodiment of FIG. 10 except that the "proportional plus derivative action" circuit ($3_2$) in the embodiment of FIG. 10 is divided further into a derivative action circuit ($3_3$) and a proportional action circuit ($3_4$) and that the input to the integral action circuit ($3_1$) and the derivative action circuit ($3_3$) is the course deviation signal $\phi_e$ and the input to the proportional action circuit ($3_4$) is the output signal $\phi_o$ of the compensating circuit (2). The embodiment of FIG. 11 can also attain the same objective.

The above-described automatic steering apparatus for ships according to the invention is advantageous in that even in the case of a ship which is subject to unusual instability, only the occurrence of unstable ship motions are eliminated and the occurrence of any detrimental steering operation tending to cause reduction in speed, etc., is practically prevented.

While the elimination of unusual phenomena through improved hull construction, etc., requires enormous cost, in accordance with the invention the elimination of unusual phenomena can be attained through the addition of a compensating circuit which is extraordinarily low in cost and thus its economical merit is very large.

In addition, the occurrence of unusual phenomena cannot be predicted during the designing of a ship's hull and they can be recognized only by the results of a sea trial of the actual ship, with the result that it has been practically impossible to take any effective measures even when any behaviour which could be presumed as an unusual phenomenon was noticed after the commissioning of the ship in service. In accordance with the invention, however, the elimination of unusual phenomena can be attained without directly carrying out any dock works on the ship hull itself as mentioned previously.

It will thus be seen from the foregoing that the present invention can be applied to any subject ships irrespective of their sizes and therefore in the face of the fact that the ships ranging from small fishing vessels to supertankers have been recently full-bodied in form for the purpose of economy of ship cost with the resulting occurrence of unusual phenomena on both the small and large ships, these unusual phenomena on the ships can also be avoided easily, thus ensuring a very wide range of applications.

Moreover, even in cases where the conditions of unusual phenomena vary due to changes in the speed and loading of a ship, the invention can still produce the desired effects irrespective of the changes.

We claim:

1. An automatic steering apparatus for ships comprising:
an adding mechanism for obtaining a deviation signal representing a difference between a predetermined course of a ship and the ship's heading, and providing an output signal; a compensating circuit for generating a compensating signal comprising an amplifying circuit which receives said deviation signal and having a gain which is increased when said deviation signal is in a small range which results in two stable steady turning conditions and thereby causing directional instability; an operational circuit which receives said compensating signal from the compensating circuit and the output signal of the adding mechanism, and which performs a proportional-plus-integral-plus derivative (PID) action to produce an output signal; a servomechanism which receives the output signal of the operational circuit and which generates a command rudder angle signal for application to the steering gear of said ship.

2. The automatic steering apparatus for ships as set forth in claim 1, wherein said amplifying circuit of said compensating circuit comprises an amplifier and a feedback circuit having a nonlinear unit connected between an input terminal and an output terminal of the amplifier.

3. The automatic steering apparatus for ships as set forth in claim 1, wherein said operational circuit comprises circuits for performing a proportional action, an integral action and a derivative action, respectively.

4. An automatic steering apparatus for ships as set forth in claim 2, wherein said nonlinear unit comprises at least one diode arranged in inverse-parallel connection.

5. An automatic steering apparatus for ships as set forth in claim 2, wherein said nonlinear unit comprises a pair of Zener diodes connected in series with each other in inverse characteristic relation.

6. An automatic steering apparatus for ships as set forth in claim 2, wherein said feedback circuit includes a gain adjusting variable resistor.

7. An automatic steering apparatus for ships as set forth in claim 1, wherein said operational circuit comprises an integral action (I) circuit and a proportional plus derivative action (PD) circuit which are connected in parallel with each other, and wherein said compensating circuit is connected to an input of said proportional plus derivative (PD) circuit.

8. An automatic steering apparatus for ships as set forth in claim 1, wherein said operational circuit comprises an integral action (I) circuit, a proportional action (P) circuit, and a derivative action (D) circuit which are connected in parallel with one another, and wherein said compensating circuit is connected to an input of said proportional action (P) circuit.

* * * * *